Jan. 3, 1956
W. A. RAY
2,729,285
SHUT-OFF VALVE SYSTEM
Filed May 22, 1951
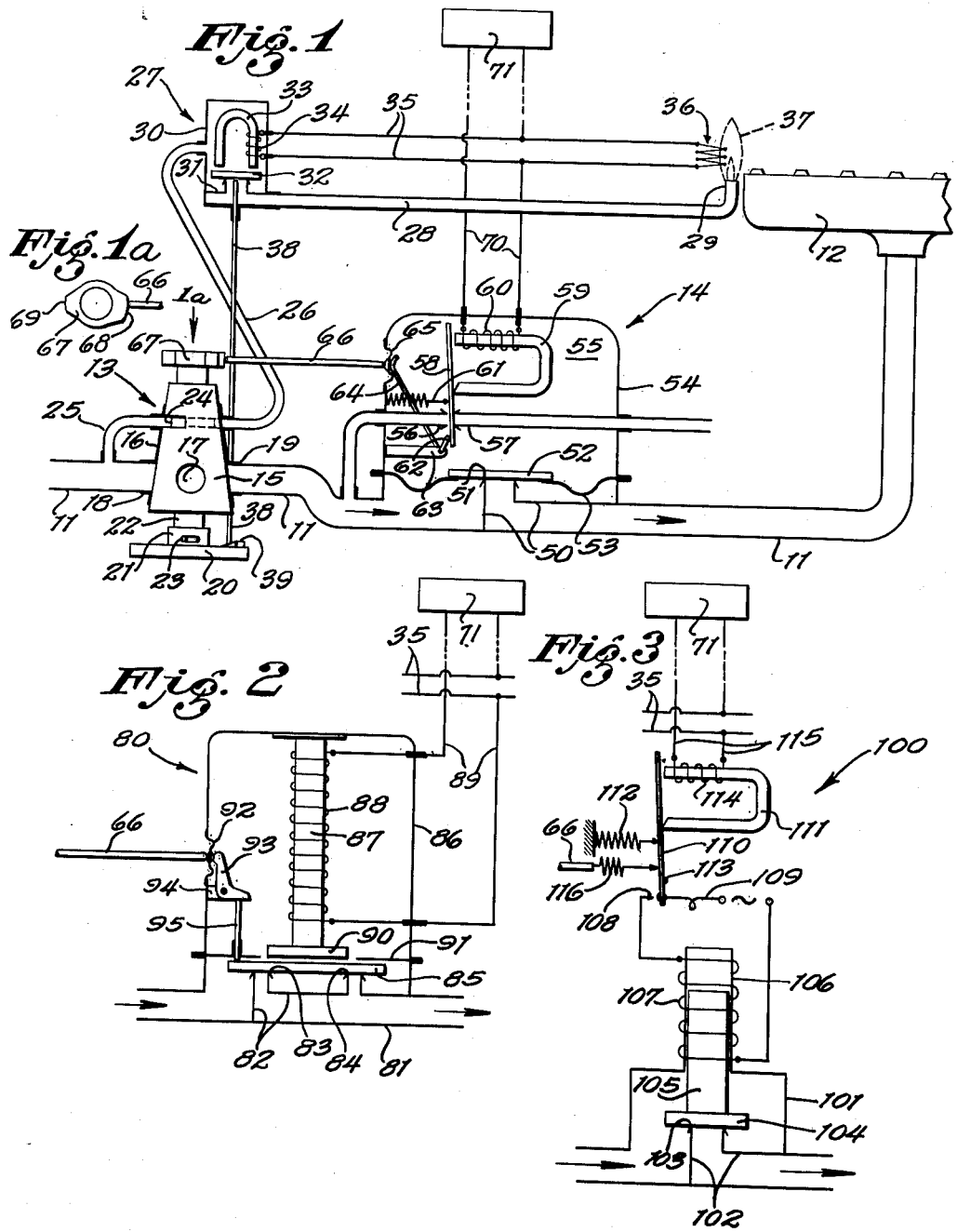
Inventor,
WILLIAM A. RAY
By John H. Rouse,
Attorney

United States Patent Office 2,729,285
Patented Jan. 3, 1956

2,729,285

SHUT-OFF VALVE SYSTEM

William A. Ray, North Hollywood, Calif., assignor to General Controls Co., Glendale, Calif., a corporation of California Application May 22, 1951, Serial No. 227,688

12 Claims. (Cl. 158—129)

This invention relates particularly to gas-burner control systems of the type which include an automatically-operated valve normally controlling flow to the burner, and a manually-operable valve for positive shut-off of the flow; the invention relating further to valve arrangements adapted for use in such a system. Examples of burner-control systems of the general character described are disclosed in my Patents No. 2,409,387 and No. 2,529,740, and in my copending application Serial No. 101,019 filed June 24, 1949, now Patent No. 2,652,109.

A main object of this invention is to guard the system against the defects in the automatically operated valve which might result in failure of that valve to close when conditions are such that it should; which defects might be due to circumstances such as weakening of a bias spring, residual magnetism, or gummy deposits from the gas passing through the valve.

To ensure closing of the automatically operated valve when the manually operable valve is closed, I provide means operated by the closing operation of the manual valve for mechanically influencing the automatic valve so as to cause it also to close.

For full understanding of the invention, and further appreciation of its features and advantages, reference is to be had to the following detailed description and accompanying drawing, and to the appended claims.

In the drawing:

Figure 1 is a schematic view of a gas-burner control system embodying this invention;

Figure 1a is a plan of the cam 67 shown in Fig. 1; and

Figures 2 and 3 are schematic views of different forms of power-operated valves adapted for use in the system of Fig. 1 in place of the power-operated valve indicated at 14 in that figure.

Referring now more particularly to Fig. 1, the numeral 11 indicates a conduit for supplying ordinary fuel-gas to a main burner 12. Connected in series in this conduit is a pair of valves generally indicated at 13 and 14.

The valve 13 is of the manually-operable type and comprises a tapered plug 15 rotatable in a correspondingly tapered socket provided by a valve shell 16; the plug having a transverse opening 17 which interconnects the inlet 18 and outlet 19 of the shell when the plug is rotated through 90° from its closed position as shown in the figure. At the bottom of the valve is an operating handle formed by a circular disk 20 having in its shank 21 an opening for freely receiving the stem 22 of plug 15; a pin 23 secured to the stem and projecting into an elongated slot in the shank 21 providing a lost-motion connection between the handle and the plug.

In the upper part of plug 15 is a groove 24 whereby communication is normally established between a pipe 25, connected to conduit 11 ahead of valve 13, and another pipe 26 which leads through a manual-reset valve 27 and pipe 28 to a pilot burner 29 arranged for igniting the main burner 12.

The groove 24 extends only part-way around the plug 15, so that when (to effect complete shut-off of the system) the plug is rotated through 180° from the position shown, communication between the pipes 25 and 26 is interrupted; these pipes intercommunicating in generally all other positions of the plug. This arrangement is disclosed in detail in my aforementioned Patent No. 2,529,740.

The manual-reset valve 27 comprises a housing 30 which is divided into an upper and a lower chamber by a ported partition 31 providing a valve seat with which a closure disk 32 cooperates; the closure, as shown, resting by gravity on the seat and thereby obstructing flow of gas to the pilot burner. The closure 32 is of magnetic material and cooperates with an electromagnet, disposed in the chamber above it, comprising a U-shaped core 33 having an energizing coil 34 which is connected by wires 35 to a thermoelectric generating device or thermopile 36 comprising a plurality of thermocouples interconnected in series; the thermopile being arranged so that its hot-junctions are in the flame 37 of pilot burner 29 when that flame exists.

The electromagnet 33—34 is not adapted, when energized, to attract the armature-closure 32 from its seat, but is capable only of holding the closure in raised position when it is first brought into engagement with the ends or pole-faces of core 33. To accomplish this, a rod 38 is provided whose upper end sealingly extends through an opening in the bottom of valve 27 to a point just below closure 32, the lower end of rod 38 resting on the top surface of the plug-valve handle 20. On that surface is a projection 39 having an inclined surface upon which the rod 38 rides when the handle is rotated through a small angle in clockwise direction (as viewed from below) from the position shown, so that the rod is moved upwardly, raising closure 32 from its seat and into engagement with the pole-faces of core 33.

After the above-described operation, upon release of handle 20 the rod 38 falls by gravity (it being assumed that there is negligible friction between the rod and valve 27) since the lost-motion connection between handle 20 and plug 15 (provided by pin 23) permits the slight free backward rotation of the handle necessary for disengagement of rod 38 from projection 39. The feature of providing a lost-motion connection to avoid the effect of plug-valve friction in an arrangement of the general character shown herein, was first disclosed by me in Patent No. 2,257,024, and is also disclosed in the aforementioned Patent No. 2,529,740.

If, when the manual-reset valve 27 is opened in the manner described above, the gas then flowing to the pilot burner is lighted and the valve is manually maintained open long enough to permit proper heating of the thermopile 36, upon release of the handle the closure 32 will remain in open position under the magnetic attraction of core 33.

The power-operated valve 14, shown in Fig. 1, is of the pressure-operated electrically-controlled type and comprises a valve casing having an inlet and an outlet, indicated by the flow-arrows, separated by a ported partition 50 providing a valve seat 51 on which a disk-like closure 52 normally rests by gravity; the closure being carried by a flexible diaphragm 53 which covers the open top of the valve casing and is clamped thereto at its margin by a housing 54 which provides a pressure chamber 55 above the diaphragm.

For controlling the pressure in chamber 55 there is a pilot valve which comprises a pair of opposed jets 56 and 57 which communicate respectively with the inlet of the valve and with the atmosphere. Flow through these jets is controlled by a blade-like closure 58, of magnetic material, which is fulcrumed on the free end of the lower arm of a U-shaped electromagnet core 59 around whose other arm is an energizing coil 60. The lower portion of armature-closure 58 extends between the jets 56 and 57 and is biased into seating engagement with the latter by the force of a compression spring 61.

As shown in the drawing, the closure 58 is being additionally held in engagement with jet 57 by the arm 62 of a bent lever pivoted on a bracket 63 and whose other arm 64 abuts the central part of a small flexible diaphragm 65 closing an opening through a side wall of the housing 54. The diaphragm 65 is shown flexed inwardly by a rod 66 extending between it and a cam 67 secured to an extension of the plug 15 of valve 13; the rod being on the surface 68 of an enlarged portion of the cam, as can be seen in Fig. 1a. The lever 62, 64 is of resilient material such as spring wire so that, while closure 58 is maintained in firm engagement with jet 57, the force applied to the parts through lever 62, 64 is not excessive.

It is to be assumed that the rod 66 is guidingly supported by any suitable means so that its left-hand end rides on the surfaces of cam 67 when the plug 15 is rotated. It is to be observed that the cam surface 68 is of such extent that the rod 66 is maintained in its projected position when the plug is rotated through the small angle necessary to effect resetting of valve 27, as described above; and that there is another cam surface 69 for similarly projecting the rod when the plug is rotated through 180° to its full-closed position, as was also described.

When the plug 15 is in open position, the rod 66 is on a surface of cam 67 between the raised surfaces 68, 69. With rod 66 in that retracted position, the diaphragm 65 is in normal position, flexed outwardly from its position as shown, so that lever 62, 64 is out of engagement with the closure 58. This closure is then free to rock toward the upper arm of core 59, when the electromagnet is energized by passage of current through coil 60, so that jet 56 is then covered and jet 57 uncovered. The coil 60 is connected by wires 70 to the thermopile 36 (in parallel with coil 34) in series with a control device 71 responsive to a condition resulting from operation of the main burner 12, such as an ordinary thermostat located in a room or space heated by the burner.

To initiate operation of the burner-control system of Fig. 1, the handle 20 of the manually-operable valve 13 is turned clockwise (as viewed from below) through the small angle necessary to effect opening of the manual-reset valve 27, as described hereinabove. The gas then issuing from the pilot burner 29 is lighted by any convenient means and the valve 27 maintained open, manually, long enough to effect proper heating of the thermopile 36 so that upon release of handle 20, and descent of rod 38, the armature-closure 32 is magnetically retained in raised position. The handle of valve 13 is then turned counter-clockwise (as viewed from below) through 90° so that the plug opening 17 registers with the openings 18—19 of the valve and gas flows to the space below diaphragm 53 of valve 14 and, through the open jet 56, to the chamber 55 above the diaphragm. Since, under these circumstances, the pressures above and below the diaphragm are the same, the diaphragm and closure 52 remain in the position shown due to the gravity bias of these parts.

The plug-valve 13 being open, the arm 62 of lever 62, 64 is now out of the path of movement of armature-closure 58 so that, when, in response to demand of thermostat 71 for heat the energizing circuit of electromagnet 59—60 is completed through the thermostat, the armature-closure 58 is attracted toward the upper arm of core 59 so that jet 56 is covered and the vent-jet 57 uncovered. The pressure in chamber 55 thus being reduced to atomspheric, the pressure of the gas below diaphragm 53 becomes effective to raise the same and closure 52, so that gas passes to the main burner 12 where it is ignited by flame 37.

In normal operation of the system the valve 14 opens and closes automatically in response to the demand of the thermostat. In the event of accidental extinguishment of the pilot-burner flame, the normally resultant closing of valves 14 and 27, due to the cessation of generation of electrical energy, effects "100% safety shut-off" of the system.

To effect shut-off of the system so that it no longer responds to the demands of the thermostat (as may be desirable during the day) the plug-valve 13 is turned to its position as shown in the drawing. In that position of the plug, gas is still supplied to the pilot burner (through groove 24) so that in order to reinitiate automatic operation of the system (in the evening) it is necessary merely to reopen the plug-valve.

To shut-off the system completely, the plug-valve is turned through 180° from its position as shown in the drawing, in which position flow of gas to the pilot burner is also obstructed due to the closing of groove 24; it then being necessary to relight the pilot burner, as described hereinabove, in order to reinitiate operation of the system. In general, a heating system may be shut-off completely only at the end of the heating season, but under some circumstances it may be desirable to effect the complete shut-off each day.

In the absence of the improvement of this invention (comprising cam 67, rod 66 and lever 62, 64) for moving the pilot-valve closure 58 mechanically to its biased position, upon deenergization of the electromagnet 59—60 following extinguishment of the pilot-burner flame when the plug is turned to its 100% shut-off position the closure 58 would normally assume its biased position wherein flow through the valve 14 is obstructed. However (in the absence of my improvement), if this closure, due to some defect, were to remain in engagement with vent 56 the condition of valve 14 would be such as to cause it to open and pass gas to the main burner upon reopening of the plug-valve, so that there would be the danger of an explosion when attempt were made to light the pilot burner.

Defects which could cause such "sticking" of the closure 58 might be due to weakening of the bias spring 61, gummy deposits from the gas, or residual magnetism. By mechanically forcing the closure to its valve-closing position, the possibility of trouble due to such defects is greatly reduced.

Further, there is a period following extinguishment of the flame 37 during which electricity in an amount sufficient to cause magnetic retention of the closure is produced by a thermoelectric generating device of the type usually employed. This period may be as long as one or two minutes, and if (in the absence of my improvement) one were to attempt to relight the pilot burner during that period, conditions would then be such that an explosion might occur.

However, if (according to this invention) the closure is first mechanically moved away from its attracted position, it could be magnetically attracted again only during the first quarter minute following extinguishment of the flame—the same electromagnet and thermoelectric generating device being assumed.

The power-operated valves shown in Figs. 2 and 3, and embodying features of the present invention, are adapted to be substituted for the valve 14 in the system of Fig. 1; the essential parts for connecting these valves in the system, and shown in Figs. 2 and 3, being the rod 66 operated by the plug-valve cam, the wires 35 leading from the source of thermoelectric energy, and the control device or thermostat 71.

The valve 80 of Fig. 2 is of the weak-current electromagnetically operated type shown in my Patents No. 2,294,421 and No. 2,548,239. It comprises a casing 81 having an inlet and an outlet, indicated by the flow-arrows, which are separated by a ported partition 82 providing a pair of valve seats 83 and 84 on which a disk-like closure 85 rests by gravity. Covering the open top of the valve casing is a housing 86, of magnetic material, from the underside of whose top wall an elongated core 87 depends. Wound around this core is a coil 88 which is connected by wires 89 and 35 to the source of electrical energy in series with thermostat 71. The core 87 is provided at its bottom with an enlarged pole-piece 90 which, with an apertured flux-conducting plate 91 extending inwardly from housing 86, defines a large annular air-gap adjacent the closure 85. This closure is of magnetic material and, in normal automatic operation of the valve, is attracted from its seats into engagement with the pole-piece upon passage of current through coil 88. To ensure closing of valve 80 when the plug-valve 13 is closed, the rod 66 is arranged to act through a sealing diaphragm 92 and a bell-crank 93, pivotally mounted on a bracket 94, to depress a rod 95 engageable with the closure 85 and thereby force the closure away from the pole-piece 90 in the event that the electromagnet is then energized, or the closure is "stuck" in raised position due to gummy deposits from the gas, or to excessive residual magnetism.

The power-operated valve of Fig. 3, indicated as a whole by the numeral 100, is of the solenoid-operated electric-relay-controlled type and comprises a valve casing 101 having a ported partition 102 which provides a valve seat 103 for a closure 104 carried by a solenoid plunger 105 reciprocable in a tubular top portion 106 of the valve casing, around which portion is an energizing coil 107. One lead of coil 107 is connected to a fixed contact 108, the other lead being connected through a source of A. C., indicated by the symbol, and a flexible wire 109 to a contact arm 110 cooperable with contact 108 and fulcrumed on one arm of a U-shaped core 111. The contact arm is biased by a spring 112 toward a stop-pin 113 and is attracted into engagement with contact 108 (to complete the circuit of solenoid coil 107) when the core 111 is energized by passage of current through its coil 114, which coil is connected to the thermoelectric source 36 by wires 115 and 35 in series with the thermostat 71. To ensure deenergization of the solenoid when the plug-valve 13 is operated to closed position, the rod 66 is here arranged to act, through a relief spring 116, on the relay arm 110 and force it to circuit-opening position, in the event that it is then in its alternate position.

To facilitate understanding of the appended claims, it is pointed out that the terms "means mechanically operable by operation of said manually operable valve" and "a mechanical connection between said valves" both read on the rod 66 shown in each of the figures; and that the term "control element" reads on the pilot-valve closure 58 of Fig. 1, the main-valve closure 85 of Fig. 2, and the switch arm 110 of Fig. 3.

The specific embodiments of my invention herein shown and described are obviously susceptible of modification without departing from the spirit of the invention, and I intend therefore to be limited only by the scope of the appended claims.

I claim as my invention:

1. In a valve system which comprises a pair of valves fluidly interconnected in series so that closing of either valve effects obstruction of flow through the system, one of the valves being automatically operable for normal control of said flow and including means biasing it to closed position, the other of the valves being normally open and manually operable to closed position to effect shut-off of said flow: the combination therewith of means, arranged to act independently of said biasing means and including means mechanically operable by operation of said manually operable valve, for effecting closing of said automatically operable valve when the manually operable valve is operated to closed position.

2. In a valve system which comprises a pair of valves fluidly interconnected in series so that closing of either valve effects obstruction of flow through the system, one of the valves being automatically operable for normal control of said flow and including means biasing it to closed position, the other of the valves being normally open and manually operable to closed position to effect shut-off of said flow: the combination therewith of means, arranged to act independently of said biasing means and including a mechanical connection between said valves, so constructed and arranged that operation of said manually operable valve to closed position effects also closure of the automatically operable valve.

3. In a valve system which comprises a pair of valves fluidly interconnected in series so that closing of either valve effects obstruction of flow through the system, one of the valves being automatically operable for normal control of said flow and including a control element movable between a first position wherein said flow is obstructed and another position wherein the flow is permitted, said automatically operable valve including means biasing said control element to its first position, the other of the valves being normally open and manually operable to closed position to effect shut-off of said flow: the combination therewith of means, arranged to act independently of said biasing means and including means mechanically operable by operation of said manually operable valve, for moving said control element to its first position when the manually operable valve is operated to closed position.

4. In a valve system which comprises a pair of valves fluidly interconnected in series so that closing of either valve effects obstruction of flow through the system, one of the valves being of the power-operated type which includes an element movable to control application of the power to the valve and means biasing said element to one position wherein flow through the valve is obstructed, the other of the valves being of the manually-operable type: the combination therewith of means, arranged to act independently of said biasing means and including a mechanical connection between the valves, so constructed and arranged that operation of said manually-operable valve to closed position effects movement of said control element to said one position.

5. In a valve system which comprises a pair of valves fluidly interconnected in series so that closing of either valve effects obstruction of flow through the system, one of the valves being automatically operable for normal control of said flow and including a control element and means biasing said element to one position wherein flow through the system is obstructed, said control element being electrically operable to another position wherein said flow is permitted, the other of the valves being normally open and manually operable to closed position to effect shut-off of said flow: the combination therewith of means, arranged to act independently of said biasing means and including means mechanically operable by operation of said manually operable valve, for moving said control element to said one position when the manually operable valve is operated to closed position.

6. In a gas-burner control system: a burner; a conduit for supplying gas to said burner; a pair of valves in said conduit for controlling flow therethrough, said valves being fluidly interconnected in series so that closing of either valve effects obstruction of supply of gas to said burner; one of said valves being of the power-operated type and including means biasing it to closed position; means responsive to a condition resulting from the operation of said burner for controlling the operation of said power-operated valve; the other of said pair of valves being of the manually-operable type; and means, arranged to act independently of said biasing means and including a mechanical connection between the valves, so constructed and arranged that operation of said manually-operable valve to closed position also effects closure of said power-operated valve regardless of the requirement of said condition responsive means.

7. In a gas-burner control ssytem: a burner; a conduit for supplying gas to said burner; a pair of valves in said conduit for controlling flow therethrough, said valves being fluidly interconnected in series so that closing of either valve effects obstruction of supply of gas to said burner; one of said valves being of the power-operated type which includes an element movable to control the application of power to the valve and means biasing said element to one position wherein flow through the valve is obstructed; means responsive to a condition resulting from the operation of said burner for controlling the operative movement of said control element; the other of said pair of valves being of the manually-operable type; and means, arranged to act independently of said biasing means and including means mechanically operable by operation of said manually-operable valve, effective when the manually-operable valve is operated to closed position to move said control element to said one position to effect closure of said power-operated valve regardless of the requirement of said condition-responsive means.

8. In a gas-burner control system: a burner; a conduit for supplying gas to said burner; a pair of valves in said conduit for controlling flow therethrough, said valves being fluidly interconnected in series so that closing of either valve effects obstruction of supply of gas to said burner; one of said valves being of the power-operated type and including a control element and means biasing said element to one position wherein supply of gas to said burner is obstructed, said element being electrically operable to another position wherein said supply is permitted; means responsive to a condition resulting from the operation of said burner for controlling the operative movement of said control element; the other of said pair of valves being of the manually-operable type; and means, arranged to act independently of said biasing means and including means mechanically operable by operation of said manually-operable valve, for moving said control element mechanically to said one position when the manually-operable valve is closed.

9. In a gas-burner control system: a main burner; a conduit for supplying gas to said main burner; a pair of valves in said conduit for controlling flow therethrough, said valves being fluidly interconnected in series so that closing of either valve effects obstruction of supply of gas to said main burner; one of said valves being of the power-operated type which includes a control element and means biasing said element to one position wherein supply of gas to said main burner is obstructed, said element being electrically operable to another position wherein said supply is permitted; a pilot burner for igniting said main burner; means influenced by the flame of said pilot burner for generating electrical energy for operating said control element to said other position; the other of said pair of valves being of the manually-operable type; and means, arranged to act independently of said biasing means and including means mechanically operable by operation of said manually-operable valve, for moving said control element mechanically to said one position when the manually-operable valve is closed.

10. A gas-burner control system as defined in claim 9, and including means responsive to a condition resulting from the operation of said main burner for controlling the supply of electrical energy for operating said control element.

11. In a gas-burner control system: a main burner; a conduit for supplying gas to said main burner; a pair of valves in said conduit for controlling flow therethrough, said valves being fluidly interconnected in series so that closing of either valve effects obstruction of supply of gas to said main burner; one of said valves being of the fluid-pressure-operated type which includes an electro-magnetically operated pilot valve for controlling application of said pressure, and means biasing said pilot valve to a position such as to effect closure of the pressure-operated valve; a pilot burner for igniting said main burner; means influenced by the flame of said pilot burner for generating electrical energy for operating said pilot valve to a position such as to effect opening of the pressure-operated valve; the other of said pair of valves being of the manually-operable type; and means, arranged to act independently of said biasing means and including means mechanically operable by operation of said manually-operable valve, for moving said pilot valve mechanically to its biased position when the manually-operable valve is closed.

12. A gas-burner control system as defined in claim 11, and including means responsive to a condition resulting from the operation of said main burner for controlling the supply of electrical energy for operating said pilot valve.

References Cited in the file of this patent

UNITED STATES PATENTS

| 2,228,588 | Ray | Jan. 14, 1941 |
| 2,363,073 | Mantz | Nov. 21, 1944 |
| 2,510,265 | Strobel | June 6, 1950 |
| 2,562,536 | Mayer | July 31, 1951 |
| 2,577,787 | Mayer | Dec. 11, 1951 |